United States Patent
Oiwa

(10) Patent No.: US 10,011,103 B2
(45) Date of Patent: Jul. 3, 2018

(54) SHEET-LAMINATING DEVICE AND SHEET-LAMINATING METHOD

(71) Applicant: NEC Corporation, Minato-ku, Tokyo (JP)

(72) Inventor: Hirokazu Oiwa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 87 days.

(21) Appl. No.: 14/382,832

(22) PCT Filed: Mar. 13, 2013

(86) PCT No.: PCT/JP2013/001633
§ 371 (c)(1),
(2) Date: Sep. 4, 2014

(87) PCT Pub. No.: WO2013/145598
PCT Pub. Date: Oct. 3, 2013

(65) Prior Publication Data
US 2015/0027632 A1    Jan. 29, 2015

(30) Foreign Application Priority Data
Mar. 30, 2012   (JP) .................. 2012-079413

(51) Int. Cl.
*B32B 38/18*   (2006.01)
*H01M 10/04*   (2006.01)
(Continued)

(52) U.S. Cl.
CPC .............. *B32B 38/18* (2013.01); *B32B 37/10* (2013.01); *B32B 38/1808* (2013.01);
(Continued)

(58) Field of Classification Search
CPC ........... Y10T 29/4911; Y10T 29/49114; Y10T 29/49108; H01M 10/0404; H01M 10/0468; B32B 38/1858; B32B 38/18
(Continued)

(56) References Cited

U.S. PATENT DOCUMENTS 5,323,527 A * 6/1994 Ribordy .................. H01M 6/10
29/623.1
2002/0007552 A1* 1/2002 Singleton .......... H01M 10/0404
29/623.3
(Continued)

FOREIGN PATENT DOCUMENTS

| CN | 1474467 A | 2/2004 |
|---|---|---|
| CN | 201750627 U | 2/2011 |

(Continued)

OTHER PUBLICATIONS

Machine Translation for JP2009-032544 (and note original copy is in the file).*

(Continued)

*Primary Examiner* — Scott W Dodds

(57) ABSTRACT

This sheet-laminating device is provided with first and second clamping devices, a first conveyance handler capable of holding a sheet with at least a portion of a periphery thereof protruding, and a control unit. The control unit causes: the first clamping device to move to a first upper position while the sheet laminate is being pressed with the second clamping device; the first conveyance handler, which is holding a first sheet, to move to a standby position above the stage from the direction opposite to the first clamping device with the stage therebetween; the first conveyance handler to be descended toward the stage to laminate the first sheet on the sheet laminate, which is being pressed by the second clamping device; and the first clamping device to be (Continued)

descended toward the stage to press the periphery of the first sheet, which is protruding from the first conveyance handler, toward the stage.

17 Claims, 8 Drawing Sheets

(51) Int. Cl.
  *H01M 10/0525* (2010.01)
  *H01M 10/0585* (2010.01)
  *B32B 37/10* (2006.01)
  *B32B 41/00* (2006.01)
(52) U.S. Cl.
  CPC ... *H01M 10/0404* (2013.01); *H01M 10/0525* (2013.01); *H01M 10/0585* (2013.01); *B32B 38/1858* (2013.01); *B32B 41/00* (2013.01); *B32B 2457/10* (2013.01); *Y10T 156/17* (2015.01); *Y10T 156/1702* (2015.01)
(58) Field of Classification Search
  USPC ............................................ 156/563
  See application file for complete search history.

(56) References Cited

U.S. PATENT DOCUMENTS

| | | | | |
|---|---|---|---|---|
| 2002/0195928 | A1* | 12/2002 | Grace | G02F 1/1341 313/503 |
| 2008/0008923 | A1* | 1/2008 | Numao | H01M 8/0228 429/457 |
| 2011/0065006 | A1 | 3/2011 | Ogasa et al. | |

FOREIGN PATENT DOCUMENTS

| | | |
|---|---|---|
| JP | 2009-32544 A | 2/2009 |
| JP | 2009-206046 A | 9/2009 |
| JP | 2010-001146 A | 1/2010 |
| JP | 2012-174389 A | 9/2012 |
| JP | 2012-221715 A | 11/2012 |
| JP | 2012-227129 A | 11/2012 |
| WO | 2011/109043 A1 | 9/2011 |
| WO | 201109043 A1 | 9/2011 |
| WO | 2012/137918 A1 | 10/2012 |
| WO | 2012/137926 A1 | 10/2012 |

OTHER PUBLICATIONS

Machine Translation for JP2009-206046 (and note original copy is in the file).*

International Search Report for PCT Application No. PCT/JP2013/001633, dated Jun. 18, 2013.

Notice, and the Submission of Observations from Third Parties for JP Application No. 2014-507383 dated Jul. 19, 2016 with English Translation.

Chinese Office Action for CN Application No. 201380017654.9 dated May 6, 2015 with English Translation.

* cited by examiner

SHEET-LAMINATING DEVICE AND SHEET-LAMINATING METHOD

This application is a National Stage Entry of PCT/JP2013/001633 filed on Mar. 13, 2013, which claims priority from Japanese Patent Application 2012-079413 filed on Mar. 30, 2012, the contents of all of which are incorporated herein by reference, in their entirety.

TECHNICAL FIELD

The present invention relates to a sheet-laminating device laminating a plurality of sheets each other and a sheet-laminating method therefor.

BACKGROUND ART

A lithium ion secondary battery has a battery element in which is an anode sheet and a cathode sheet were laminated on both sides of a separator impregnated with an electrolyte. When such battery element is produced, a plurality of sheets, that is, an anode sheet, a cathode sheet and a separator are laminated mutually. Therefore, a manufacturing device for a laminate type battery which can carry out a method to laminate an anode sheet, a cathode sheet and a separator and to form a sheet laminate is used (refer to patent literature 1 and patent literature 2).

In a device described in patent literature 1 or patent literature 2, when another sheet is laminated on the sheet laminate on a base or a palette, two corners which constitute opposite corners of the sheet laminate are held by two nails or clampers. Next, when another sheet is laminated on the sheet laminate, two corners which constitute another opposite corners of the sheet laminate are held by another two nails or clampers. By repeating this operation, the sheet laminate including pieces of a predetermined number of sheets is formed on the base. Thus, in the device described in patent literature 1 or patent literature 2, when sheets are laminated, two nails or clampers of opposite corners among four nails or clampers are driven alternately.

CITATION LIST

Patent Literature

[PTL 1] Japanese Patent Application Laid-Open No. 2009-032544

[PTL 2] Japanese Patent Application Laid-Open No. 2009-206046

SUMMARY OF INVENTION

Technical Problem

Each sheet constituting a sheet laminate is conveyed onto a stage by a conveyance handler which can hold a sheet. In patent literature 1, it is not written clearly about a conveyance handler which conveys the sheet onto the stage. However, the inventor of the present application found that the following problems might generate in the method of holding the sheet laminate simultaneously by the clamping devices in the positions of the opposite corners of the sheet laminate. Hereinafter, the problems are described.

When the first sheet is laminated on the sheet laminate, a pair of clamping devices located in the opposite corners holds the sheet laminate. On the other hand, another pair of clamping devices is ascended from the stage in order to hold another sheet placed on the sheet laminate newly. Here, when the pair of clamping devices is ascended before the conveyance handler conveys the first sheet to above the stage, a problem may generate such that the movement of the conveyance handler is disturbed. Therefore, it is usually thought that a pair of clamping devices is ascended after the conveyance handler has finished conveying a sheet to above the stage. After ascending these clamping devices, the conveyance handler comes down toward the stage and laminates a sheet on the sheet laminate on the stage.

Thus, there is a temporal gap equivalent to a time to ascend the clamping devices between before the sheet is placed on the sheet laminate after the conveyance handler arrives at the upper part of the stage. By this temporal gap, a cycle time to laminate the sheet is increased.

An object of the present invention is to provide a sheet-laminating device and a sheet-laminating method which can reduce a cycle time in laminating a sheet in view of the problems in the background art mentioned above.

Solution to Problem

A sheet-laminating device according to the present invention includes:

a stage which loads a sheet laminate constituted by a plurality of sheets being laminated;

a first conveyance handler which can move between a standby position located above a stage and a retracted position retracted from the standby position, and can move vertically to the stage, and is capable of holding a sheet with at least a portion of a periphery thereof protruding;

a first clamping device movable between a first pressing position where a first side of the sheet laminate on the stage is pressed toward the stage, and a first upper position that is above the first pressing position, and is adjacent to the standby position;

a second clamping device movable between a second pressing position where a second side different from the first side of the sheet laminate on the stage is pressed toward the stage and a second upper position that is above the second pressing position, and is adjacent to the standby position; and a control unit causing: the first clamping device to move to the first upper position while the second side of the sheet laminate on the stage is being pressed with the second clamping device; the first conveyance handler, which is holding a first sheet, to move to the standby position above the stage from the direction opposite to the first clamping device with the stage therebetween; the first conveyance handler to be descended toward the stage to laminate the first sheet on the sheet laminate, which is being pressed by the second clamping device; and the first clamping device to be descended toward the stage to press the periphery of the first sheet, which is protruding from the first conveyance handler, toward the stage.

A sheet-laminating method according to the present invention is a sheet-laminating method using a sheet conveying device which includes:

a stage which loads a sheet laminate constituted by a plurality of sheets being laminated; a first conveyance handler which can move between a standby position located above the stage and a retracted position retracted from the standby position, and can move vertically to the stage, and is capable of holding a sheet with at least a portion of a periphery thereof protruding; a first clamping device movable between a first pressing position where a first side of the sheet laminate on the stage is pressed toward the stage, and a first upper position that is above the first pressing position, and is adjacent to the standby position; and a second clamping device movable between a second pressing position where a second side different from the first side of the sheet laminate on the stage is pressed toward the stage and a second upper position that is above the second pressing position, and is adjacent to the standby position, the method including:

moving the first clamping device to the first upper position while the second side of the sheet laminate on the stage is being pressed with the second clamping device;

moving the first conveyance handler, which is holding a first sheet, to the standby position above the stage from the direction opposite to the first clamping device with the stage therebetween;

descending the first conveyance handler toward the stage, and laminating the first sheet on the sheet laminate, which is being pressed by the second clamping device;

and descending the first clamping device toward the stage, and pressing the periphery of the first sheet, which is protruding from the first conveyance handler, toward the stage.

Advantageous Effects of Invention

According to the present invention, a cycle time in laminating a sheet can be reduced.

DESCRIPTION OF EMBODIMENTS

Hereinafter, preferred exemplary embodiments of the present invention are described with reference to drawings.

First Exemplary Embodiment

Figure 1:
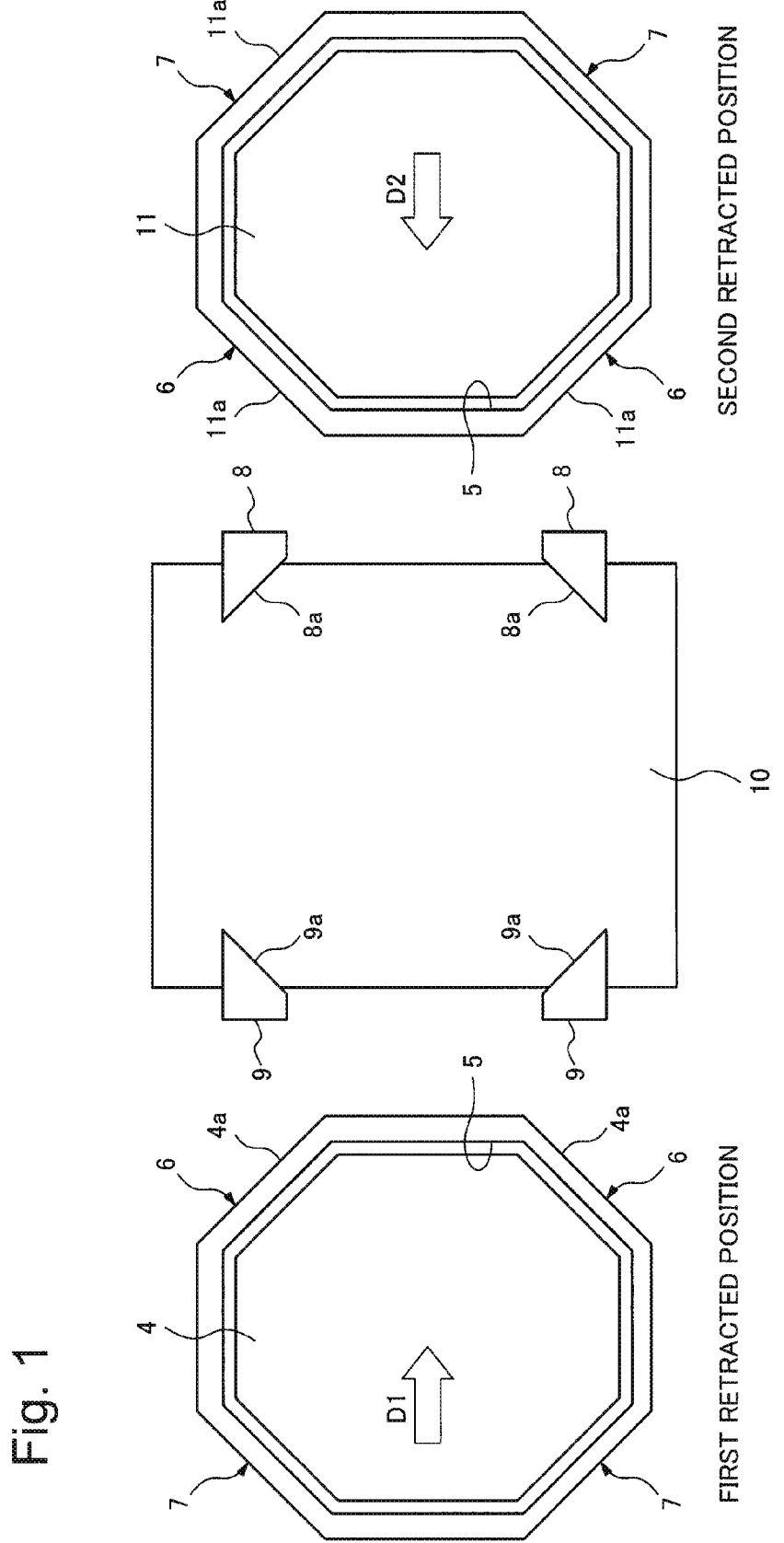
FIG. 1 is a schematic plan view of a sheet-laminating device in a first exemplary embodiment of the present invention.
Figure 2:
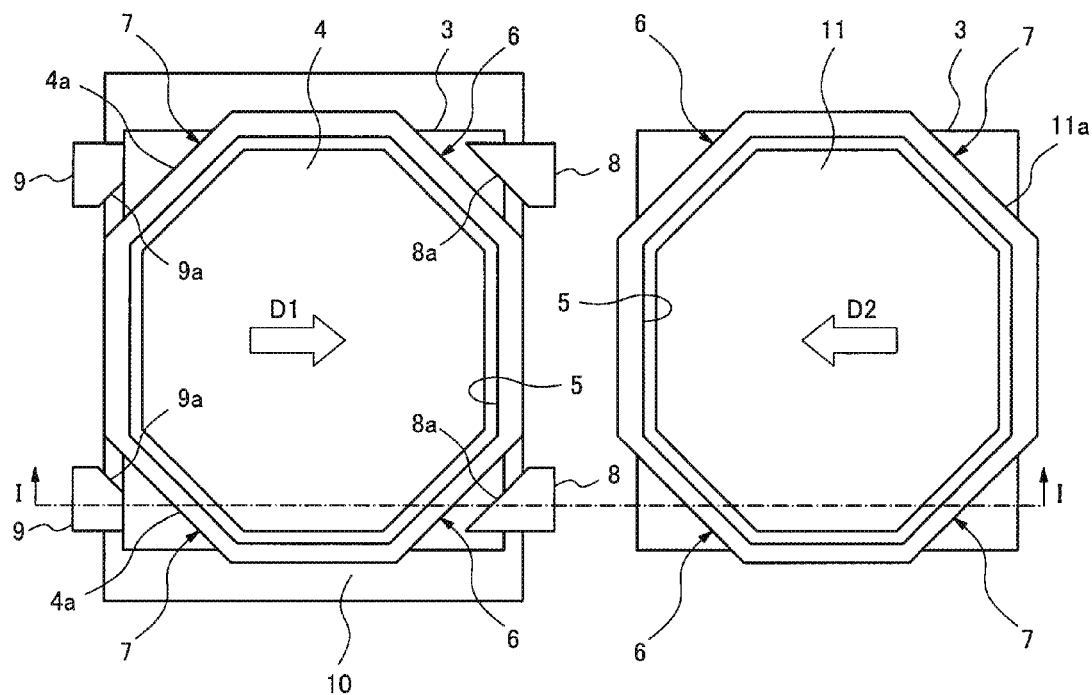
FIG. 2 is a schematic plan view of the sheet-laminating device in a certain state of the first exemplary embodiment.
Figure 3:
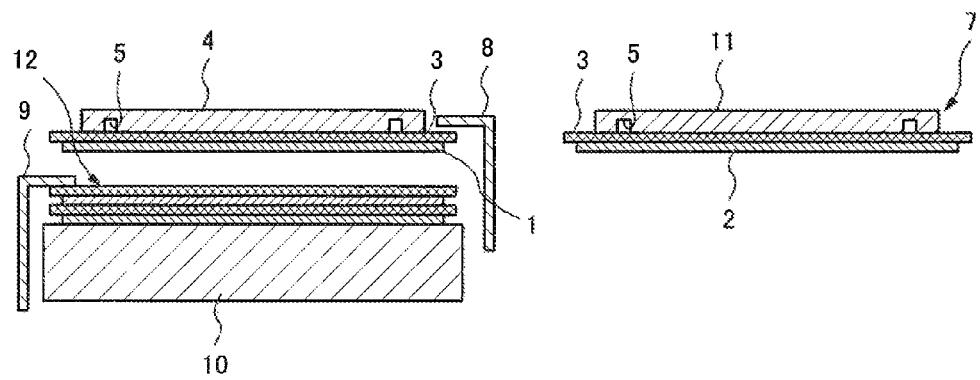
FIG. 3 is a schematic cross sectional view of the sheet-laminating device along an I-I line of FIG. 2.
Figure 4:
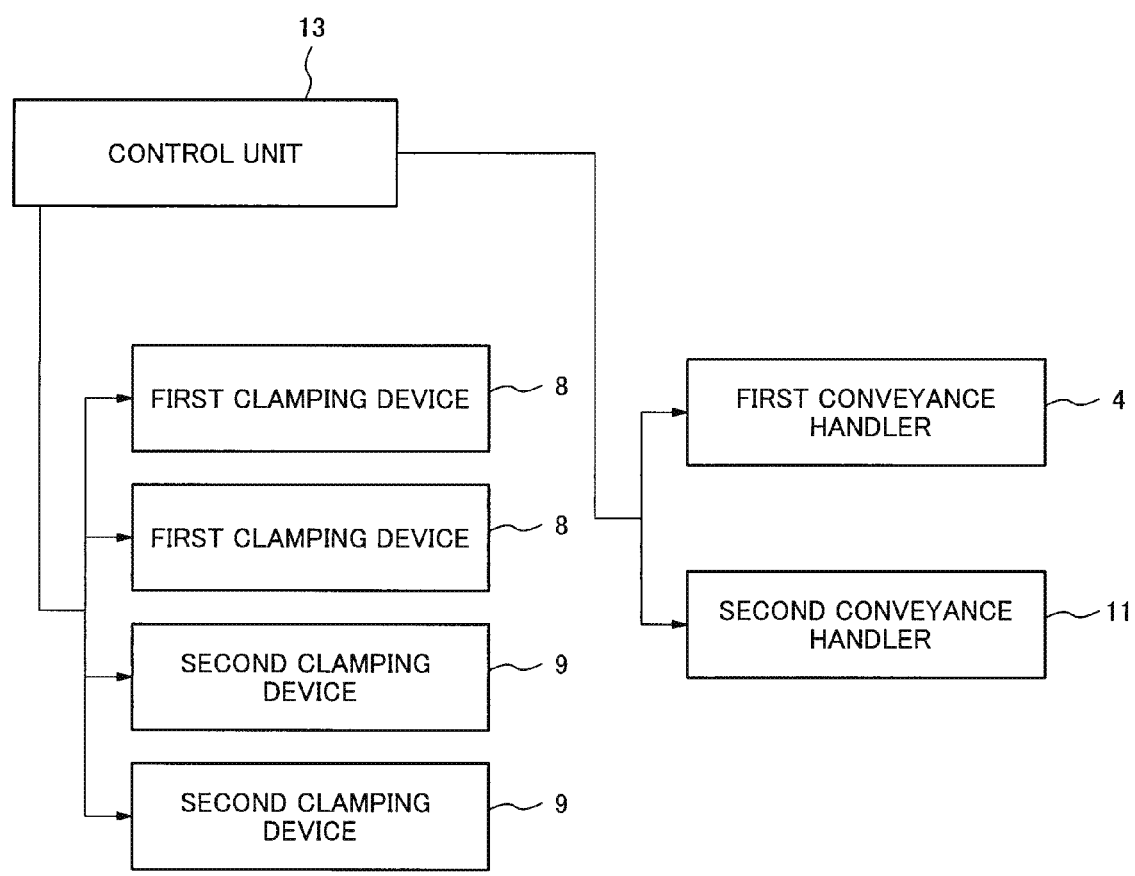
FIG. 4 is a block diagram showing an outline of a control system of the sheet-laminating device.

FIG. 1 is a schematic plan view of a sheet-laminating device in a first exemplary embodiment of the present invention. FIG. 2 is a schematic plan view of the sheet-laminating device in a certain state of the first exemplary embodiment. FIG. 3 is a schematic cross sectional view of the sheet-laminating device along an I-I line of FIG. 2. FIG. 4 is a block diagram showing an outline of a control system of the sheet-laminating device.

As shown in FIG. 1, a sheet laminating device according to a first exemplary embodiment of the present invention includes a stage 10, first clamping devices 8, second clamping devices 9, a first conveyance handler 4 and a second conveyance handler 11.

A sheet laminate 12 constituted by a plurality of sheets being laminated is loaded on the stage 10. In this exemplary embodiment, a case when the sheet laminate 12 includes a first sheet 1, a second sheet 2 and an interlayer sheet 3 is described. However, it is not limited thereto, and any kind of sheet may be used for a sheet composing the sheet laminate 12.

The first conveyance handler 4 and the second conveyance handler 11 are provided with a suction groove 5 for holding sheets 1, 2 and 3. The first conveyance handler 4 and the second conveyance handler 11 adhere the sheets 1, 2 and 3 by sucking an enclosed space formed by the suction groove 5 and the sheets 1, 2 and 3 with an unillustrated suction pump, and hold the sheets 1, 2 and 3 via the suction groove 5. A means which holds a sheet is not limited to a suction holding, and an optional means can be used.

In an example shown in FIG. 3, the first conveyance handler 4 can hold an interlayer sheet 3 and the first sheet 1. The second conveyance handler 11 can hold an interlayer sheet 3 and the second sheet 2. It is desirable that the interlayer sheet 3 has air permeability. The conveyance handlers 4 and 11 can perform suction holding of the first or the second sheets 1 and 2 via the interlayer sheet 3 using permeability of the interlayer sheet 3.

The first conveyance handler 4 is movable between a standby position above the stage 10 and a first retracted position retracted from the standby position. The second conveyance handler 11 is movable between the standby position above the stage 10 and a second retracted position retracted from the standby position. In FIG. 1, the state that the first conveyance handler 4 is located in the first retracted position is shown, and the state that the second conveyance handler 11 is located in the second retracted position is shown. In case of this exemplary embodiment, the second retracted position is located opposite to the first retracted position with the standby position therebetween.

In FIG. 2 and FIG. 3, the state that the first conveyance handler 4 is located in the standby position is shown, and the state that the second conveyance handler 11 is located in the second retracted position is shown. Here, a direction in which the first conveyance handler 4 holding a sheet moves from the first retracted position to the standby position above the stage 10, in other words, a direction in which the held sheet is conveyed to the standby position from the first retracted position, and a direction shown in FIG. 1 and the FIG. 2 by an arrow is set as a first movement direction D1. A direction in which the second conveyance handler 11 holding a sheet moves to the standby position above the stage, in other words, a direction in which the held sheet is conveyed to the standby position from the second retracted position, and a direction shown in FIG. 1 and FIG. 2 by an arrow is set as a second movement direction D2. The first movement direction D1 in which the first conveyance handler 4 holding a sheet moves toward the standby position is different from the second movement direction D2 in which the second conveyance handler 11 holding a sheet moves toward the standby position.

Specifically, the first conveyance handler 4 moves from the left side in FIGS. 1 to 3 toward the standby position in the state of holding the first sheet 1 and the interlayer sheet 3. It moves from the standby position in FIGS. 1 to 3 toward the left side in the state of not holding the first sheet 1 and the interlayer sheet 3. The second conveyance handler 11 moves from the right side in FIGS. 1 to 3 toward the standby position in the state of holding the second sheet 2 and the interlayer sheet 3. It moves from the standby position in FIGS. 1 to 3 toward the right side in the state of not holding the second sheet 2 and the interlayer sheet 3.

The first conveyance handler 4 is composed to be movable downward toward the stage 10 from the standby position. Similarly, the second conveyance handler 11 is composed to be movable downward toward the stage 10 from the standby position. Thus, the first conveyance handler 4 and the second conveyance handler 11 are composed to be movable vertically to the stage 10.

The first conveyance handler 4 and the second conveyance handler 11 hold the sheet with at least a portion of a periphery thereof protruding. Therefore, as shown in FIG. 1 and FIG. 2, the first conveyance handler 4 and the second conveyance handler 11 have cut-out portions 6 and 7 in four corners. When the first conveyance handler 4 and the second conveyance handler 11 hold a sheet, a part of the periphery of the sheet protrudes from these cut-out portions 6 and 7.

In FIG. 2, hatching has been added also to the part of the suction groove 5 in order to make intelligible an overlapped state of the interlayer sheet 3, and the first conveyance handler 4 and the second conveyance handler 11.

The first clamping devices 8 are composed to be movable between a first pressing position in which a first side of the sheet laminate 12 on the stage 10 is pressed toward the stage 10, and a first upper position which is above the first pressing position and is adjacent to the standby position of the conveyance handlers 4 and 11. The second clamping devices 9 are composed to be movable between a second pressing position in which the second side different from the first side of the sheet laminate 12 on the stage 10 is pressed toward the stage 10, and a second upper position which is above the second pressing position and is adjacent to the standby position of the conveyance handlers 4 and 11.

When seeing from the direction vertical to a surface of the sheet laminate 12 as shown in FIG. 2, the first clamping devices 8 are located in a position of the first cut-out portions 6 of the first conveyance handler 4, and the second clamping devices 9 are located in a position of the second cut-out portions 7. Thereby, in the standby position above the stage 10, the first conveyance handler 4 and the second conveyance handler 11 do not interfere with the first clamping devices 8 and the second clamping devices 9 located in the first or the second upper position.

By descending the first clamping device 8 with the first conveyance handler 4 from the state shown in FIG. 3, the first sheet 1 and the interlayer sheet 3 can be laminated on the laminate 12. At that time, the first clamping device 8 that descended presses the laminate 12 with the first sheet 1 and the interlayer sheet 3. The second clamping device 9 pressing the laminate 12 before the first clamping device 8 descended will be inserted between the laminate 12 and the sheets 1 and 3.

As shown in a FIG. 2, it is desirable that a side 9a of the second clamping device 9 which confronts to the first conveyance handler 4 in the standby position is parallel to one side 4a of the first conveyance handler 4 opposing the side 9a. Similarly, it is desirable that a side 8a of the first clamping device 8 which confronts to the second conveyance handler 11 in the standby position is parallel to one side 1a of the second conveyance handler 11 opposing the side 8a. Thereby, when the sheets 1 and 3 run aground on the second clamping device 9, damage of the sheets 1 and 3 can be suppressed. Because these cut-out portions 6 and 7 are in the opposite side of the movement direction of the conveyance handler holding a sheet, they do not become a cause by which a sheet is exfoliated under an influence of a wind accompanying the movement of the conveyance handler.

In the example shown in FIG. 1 and FIG. 2, two of the first clamping devices 8 are installed, and two of the second clamping devices 9 are installed. A pair of the first clamping devices 8 is composed so that two corners of one side of a substantially rectangle or a square sheet laminate 12 can be pressed. A pair of the second clamping devices 9 is composed so that two corners of another one side of the sheet laminate 12 can be pressed.

The sheet-laminating device further includes a control unit 13 which controls operation of the first clamping devices 8, the second clamping devices 9, the first conveyance handler 4 and the second conveyance handler 11 (refer to FIG. 4). The control unit 13 realizes a series of processes of a sheet-laminating method shown in FIG. 5 and FIG. 6.

Next, a sheet-laminating method in one exemplary embodiment of the present invention will be described with reference to FIG. 5 and FIG. 6. In this sheet-laminating method, a sheet laminate including a plurality of sheets is formed on the stage 10.

FIG. 5A shows the state just after the second sheet 2 and the interlayer sheet 3 has been laminated over the sheet laminate 12 on the stage 10. At that time, the first clamping device 8 is pressing the sheet laminate 12 and is inserted between the sheet laminate 12 and the second sheet 2. The second clamping device 9 is pressing the sheet laminate 12 with the second sheet 2 and the interlayer sheet 3. The sheet laminate, the second sheet and the interlayer sheet shown in FIG. 5A are gathered and will be called a sheet laminate from now on.

Next, the first clamping device 8 is moved in the right direction in the drawing while the sheet laminate on the stage 10 is being pressed with the second clamping device 9, and is retracted from the sheet laminate 12 (refer to FIG. 5B). Further, the first clamping device 8 is ascended to a predetermined height like the direction of the arrow, and is moved in the left direction in the drawing (refer to FIG. 5C).

Next, the first conveyance handler 4 moves to the standby position above the stage 10 while adhering the first sheet 1 and the interlayer sheet 3 (refer to FIG. 5D). That is, the first conveyance handler 4 is moved to the standby position above the stage 10 from an opposite direction of the first clamping device 8 with the stage therebetween. When moving the first conveyance handler 4 from the first retracted position to the standby position above the stage 10, the first conveyance handler 4 is passing the upper part of the second clamping device 9 that descends and is pressing the sheet laminate 12 in case of FIG. 5D.

The first conveyance handler 4 may be started to move while the first clamping devices 8 are ascended. In this case, it is desirable to finish moving the first clamping device 8 to the first upper position before finishing moving the first conveyance handler 4 to the standby position.

When the first conveyance handler 4 reaches the standby position, the first clamping device 8 in the first upper position is located in the cut-out portion 6 formed in the front side of the movement direction D1 of the first conveyance handler 4. Accordingly, the first clamping device 8 does not disturb the movement of the first conveyance handler 4.

The second clamping device 9 located in the rear side in the movement direction D1 of the first conveyance handler 4 is in the state of descending and is pressing the sheet laminate 12. Accordingly, the second clamping device 9 does not interfere in the movement of the first conveyance handler 4.

Next, as shown in FIG. 5E, the first conveyance handler 4 is descended toward the stage 10, and first sheet 1 and the interlayer sheet 3 are laminated on the sheet laminate 12. In the method of this exemplary embodiment, the first clamping devices 8 are in the state of having already finished moving to the first upper position before the first conveyance handler 4 reaches the standby position. Therefore, the first conveyance handler 4 can start descending operation promptly after reaching the standby position. Thereby, a cycle time in a sheet-laminating method can be reduced.

The first clamping devices 8 are descended toward the stage 10 with a descent of the first conveyance handler 4, and a periphery of the first sheet 1 protruding from the first conveyance handler 4 is pressed toward the stage 10 (refer to FIG. 5F). As a result, the first clamping device 8 holds the sheet laminate 12 with the first sheet 1 and the interlayer sheet 3. The second clamping device 9 will be in the state of being inserted between the sheet laminate 12 and the first sheet 1.

In the above mentioned description, although described by assuming that the first conveyance handler 4 is descended toward the stage 10, and then the first clamping devices 8 are descended toward the stage 10, and the periphery of the first sheet 1 protruding from the first conveyance handler 4 is pressed toward the stage 10, it is desirable that the descent of the first conveyance handler 4 and the descent of the first clamping device 8 are performed simultaneously. That is, it is desirable to operate so that the descent of the first conveyance handler 4 and the descent of the first clamping device 8 may be performed simultaneously from the state of FIG. 5D, and it may be shifted to the state of FIG. 5F. As a result, a cycle time in the sheet laminating method can be reduced more.

Below, a member including the sheet laminate 12, the first sheet 1 and the interlayer sheet 3 shown in FIG. 5F is called a sheet laminate 12. Next, the first conveyance handler 4 is ascended to the standby position above the stage 10 (refer to FIG. 5G). In order to hold another first sheet 1 and an interlayer sheet 3, the first conveyance handler 4 is retracted to the retracted position from above the stage 10 (refer to FIG. 5H).

And the second clamping devices 9 are retracted laterally from the sheet laminate 12 (refer to FIG. 6A). The second clamping devices 9 are ascended to the stage 10 (refer to FIG. 6B). And the second clamping device 9 moves in the right direction in the drawing again (refer to FIG. 6C). As a result, the second clamping device 9 finishes moving to the second upper position. At that time, the first clamping devices 8 are pressing the sheet laminate 12 toward the stage 10.

As shown in FIG. 6D, the second conveyance handler 11 is moved to the standby position above the stage 10 from the direction of the opposite side of the second clamping device 9 with the stage 10 therebetween. When moving the second conveyance handler 11 from the second retracted position to the standby position above the stage 10, the second conveyance handler 11 is passing the upper part of the first clamping device 8 that descends and is pressing the sheet laminate 12 in case of FIG. 6D. The second conveyance handler 11 holds the interlayer sheet 3 and the second sheet 2. The second conveyance handler 11 is different from the first conveyance handler 4, and moves to the standby position along the movement direction D2.

The second conveyance handler 11 may be started to move while the second clamping device 9 is ascended. In this case, it is desirable that the second clamping device 9 is finished moving to the second upper position before the second conveyance handler 11 is finished moving to the standby position.

When the second conveyance handler 11 reaches the standby position, the second clamping device 9 in the second upper position is located in the cut-out portion 6 formed in the front side of the movement direction D2 of the second conveyance handler 11. Accordingly, the second clamping device 9 does not disturb the movement of the second conveyance handler 11.

The first clamping device 8 located in the rear side in the movement direction D2 of the second conveyance handler 11 is in the state of being descended, and is pressing the sheet laminate 12. Accordingly, the first clamping device 8 does not interfere in the movement of the second conveyance handler 11.

Next, as shown in FIG. 6E, the second conveyance handler 11 holding the second sheet 2 and the interlayer sheet 3 is descended toward the stage 10, and the second sheet 2 and the interlayer sheet 3 are laminated on the sheet laminate 12. In the method of this exemplary embodiment, the second clamping device 9 is in the state of having already finished moving to the second upper position before the second conveyance handler 11 reaches the standby position. Therefore, the second conveyance handler 11 can start descending operation promptly after reaching the standby position. As a result, a cycle time in the sheet-laminating method can be reduced.

The second clamping device 9 is descended toward the stage 10 as the second conveyance handler 11 descends, and the periphery of the second sheet 2 that protrudes from the second conveyance handler 11 is pressed toward the stage 10 (refer to FIG. 6F). As a result, the second clamping device 9 holds the sheet laminate 12 and the second sheet 2. The first clamping device 8 becomes a state placed between the sheet laminate 12 and the second sheet 2.

In the above mentioned description, although described by assuming that the second conveyance handler 11 is descended toward the stage 10, and then the second clamping devices 9 are descended toward the stage 10, and a part of the periphery of the second sheet 2 that protrudes from the second conveyance handler 11 is pressed toward the stage 10, it is desirable that the descent of the second conveyance handler 11 and the descent of the second clamping device 9 are performed simultaneously. That is, it is desirable to operate so that the descent of the second conveyance handler 11 and the descent of the second clamping device 9 may be performed simultaneously, and it may be shifted to the state of FIG. 6F from the state of FIG. 6D. As a result, a cycle time in the sheet laminating method can be reduced.

Next, the second conveyance handler 11 is ascended to the standby position above the stage 10 (refer to FIG. 6G). In order to hold another sheet, the second conveyance handler 11 is retracted to the retracted position from above the stage 10 (refer to FIG. 6H).

The state after the evacuation of the second conveyance handler 11 is the state as shown in FIG. 5A. After this, more another sheet can be laminated on the laminate 12 on the stage 10 by performing the steps shown in FIGS. 5A-5H or FIGS. 5A-5D and FIGS. 5F-5H again. A sheet laminate in which optional numbers of sheets are laminated each other can be formed by repeating FIGS. 5A-5H and FIGS. 6A-6H, or FIGS. 5A-5D, FIGS. 5F-5H, FIGS. 6A-6D and FIGS. 6F-6H.

The sheet laminate for which the lamination was finished is fixed using other clamping means such as a clip or a tape, which is independent from the laminating device, and it is taken out from the sheet-laminating device after releasing a clamp by the first clamping devices 8 and the second clamping devices 9.

In the above-mentioned sheet-laminating method, it is desirable that the two of the first clamping devices 8 move together. It is desirable that the two of the second clamping devices 9 move together. Thereby, two positions in an identical side of the sheets 1, 2, or 3 or the laminate 12, two corners thereof in particular, can be held simultaneously. As a result, compared with a case where the opposite corners of the sheet are held down simultaneously, it is hard to generate a force (moment) of rotating the sheet, and lamination misalignment of the sheet can be suppressed.

Next, a sheet-laminating method in a comparative example in which two clamping devices located in the opposite corners are driven simultaneously will be described. When two clamping devices 8 and 9 located in the opposite corners are ascended simultaneously, the clamping devices 8 and 9 will be located in both sides thereof with the standby position of the conveyance handlers 4 and 11 therebetween. Accordingly, because one clamping device 8 or 9 is located on the course of the conveyance handlers 4 and 11, a movement of the conveyance handlers 4 and 11 will be disturbed. Therefore, it is necessary to ascend the clamping devices 8 and 9 located in the opposite corners after moving the conveyance handlers 4 and 11 to the standby position as shown in FIG. 5D and FIG. 6D. As a result, the conveyance handlers 4 and 11 cannot perform move-down operation until rising movement of the clamping devices 8 and 9 ends after the conveyance handlers 4 and 11 arrive at the standby position. By this temporal gap, a cycle time becomes longer than the sheet-laminating method shown in FIG. 5 and FIG. 6. Because two parts in the opposite corners of the sheet laminate or the sheet are held down simultaneously, there is also a problem that the force (moment) that rotates the sheet might be generated.

In contrast, according to this exemplary embodiment of the present invention, the first clamping devices 8 does not disturb the movement of the first conveyance handler 4, and the second clamping devices 9 does not disturb the movement of the second conveyance handler 11. The restriction in operation that the clamping devices 8 and 9 located in the opposite corners are ascended after moving the conveyance handlers 4 and 11 to the standby position is not received. As a result, a sheet-laminating device and a sheet-laminating method which reduce a cycle time in laminating a sheet can be provided.

The sheet-laminating method of the above-mentioned exemplary embodiment can be applied to a method to produce a battery element like a lithium ion secondary battery, for example. In this case, the first sheet may be an anode sheet to which a positive active material was applied, and the second sheet may be a cathode sheet to which a negative active material was applied. The interlayer sheet may be a separator which separates an anode sheet and a cathode sheet. The separator is impregnated with an electrolyte and preferably it has permeability. An electrical element including a laminate in which an anode sheet and a cathode sheet and a separator are laminated can be produced by the method shown in FIG. 4 and FIG. 5.

Figure 5:
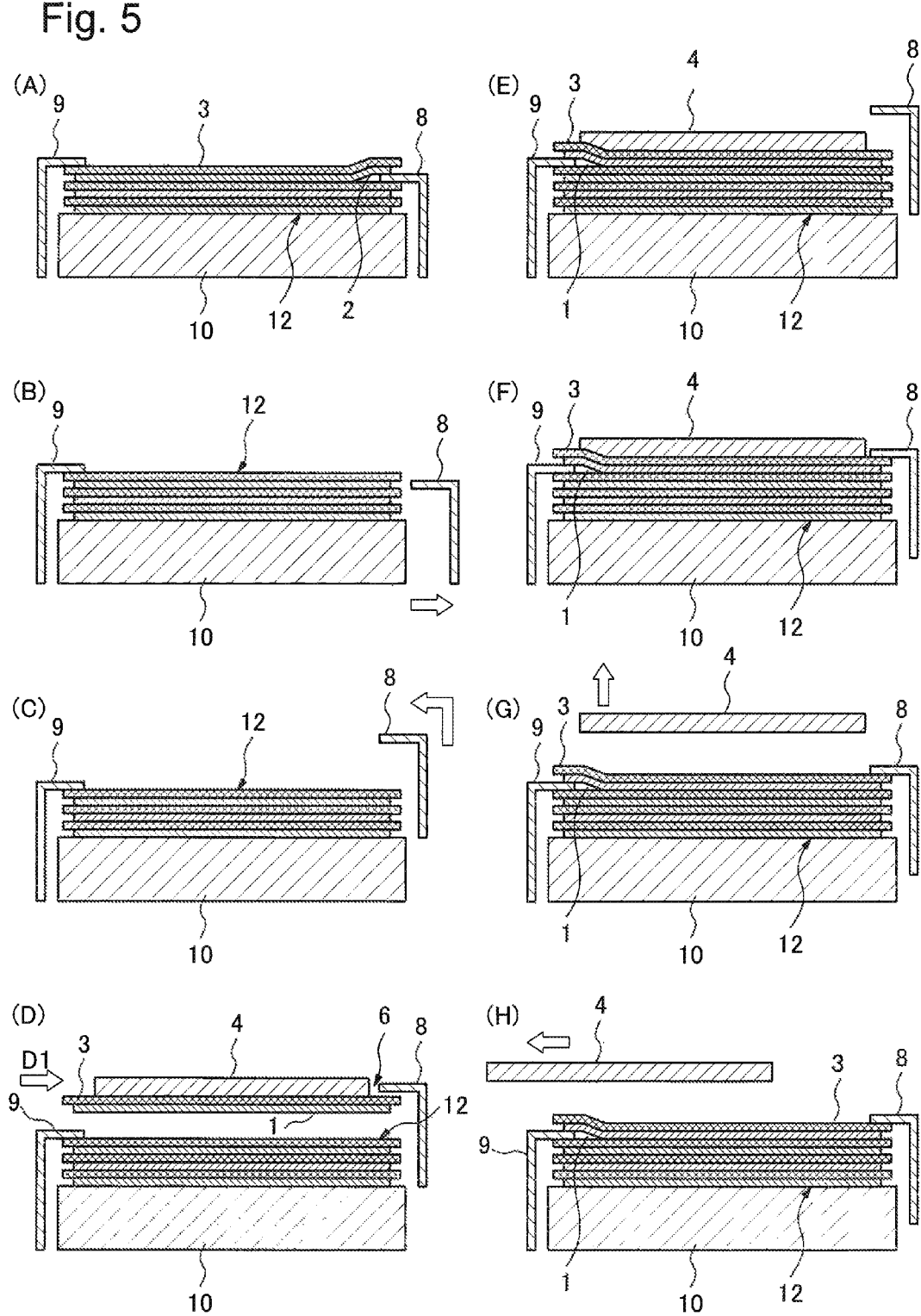
FIGS. 5A-5H are diagrams showing a process to laminate a first sheet and an interlayer sheet in a sheet-laminating method.
Figure 6:
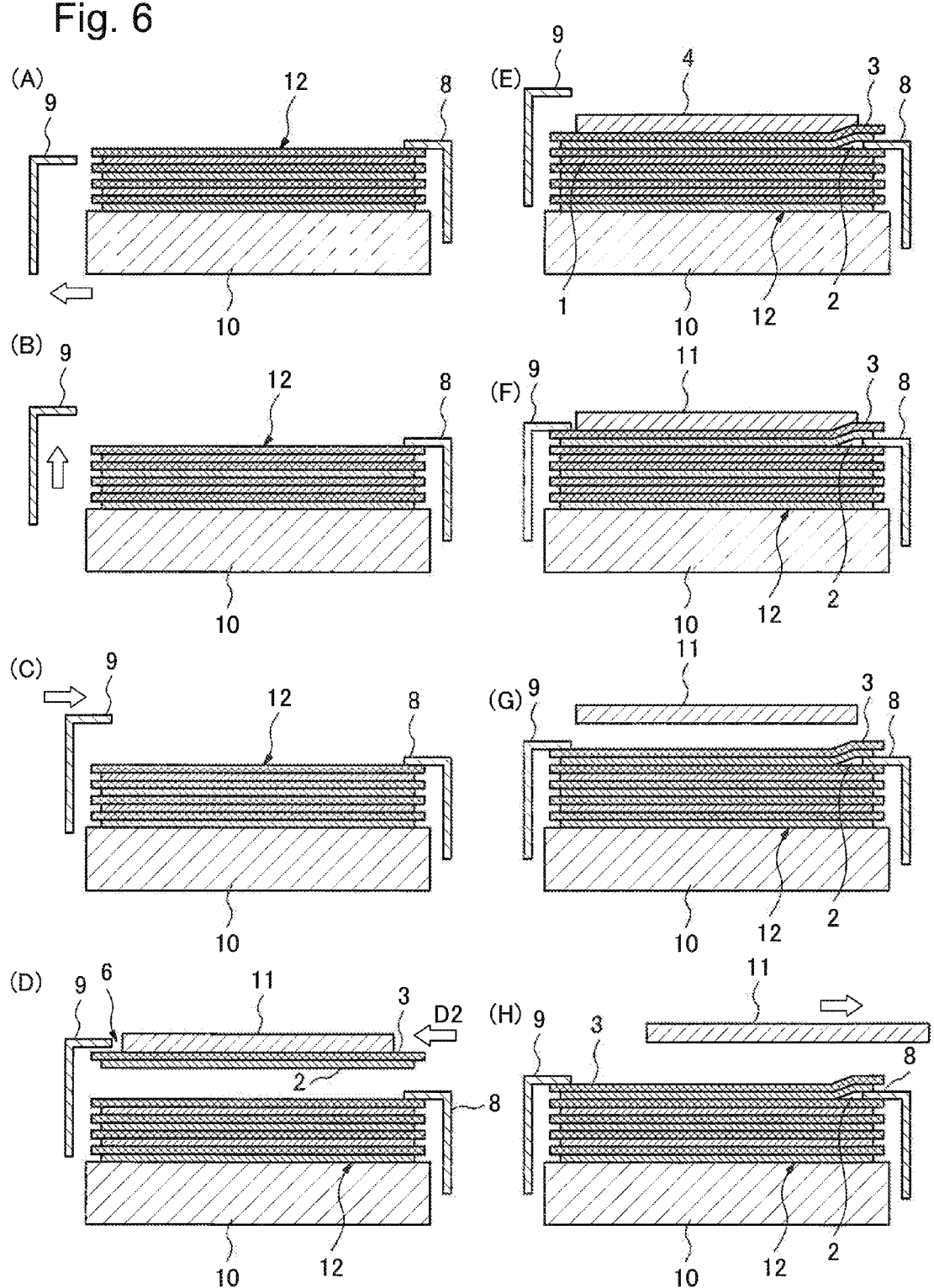
FIGS. 6A-6H are diagrams showing a process to laminate a second sheet and an interlayer sheet in the sheet-laminating method.

In the example shown in FIG. 5 and FIG. 6, the example of laminating three kinds of sheets, that is, the first sheet 1, the second sheet 2 and the interlayer sheet 3 was described. Alternatively, the sheet-laminating device and the sheet-laminating method of the present invention can be applied to a case where the first sheet 1 and the second sheet 2 are laminated alternately. In this case, the first conveyance handler 4 or the second conveyance handler 11 should hold the first sheet 1 or the second sheet 2 directly respectively without the interlayer sheet 3. The first sheet 1 and the second sheet 2 may be the same kind, and may be different kinds.

In the example shown in FIG. 5 and FIG. 6, the first conveyance handler 4 conveyed the first sheet 1 and the interlayer sheet 3 simultaneously, and the second conveyance handler 11 conveyed the second sheet 2 and the interlayer sheet 3 simultaneously. It is limited to this, and the first conveyance handler 4 may convey the first sheet 1 and the second sheet 2 separately, and the second conveyance handler 11 may convey the interlayer sheet 3. Even in this case, a sheet laminate 12 can be formed via the same process as the method shown in FIG. 5 and FIG. 6.

Second Exemplary Embodiment

Figure 7:
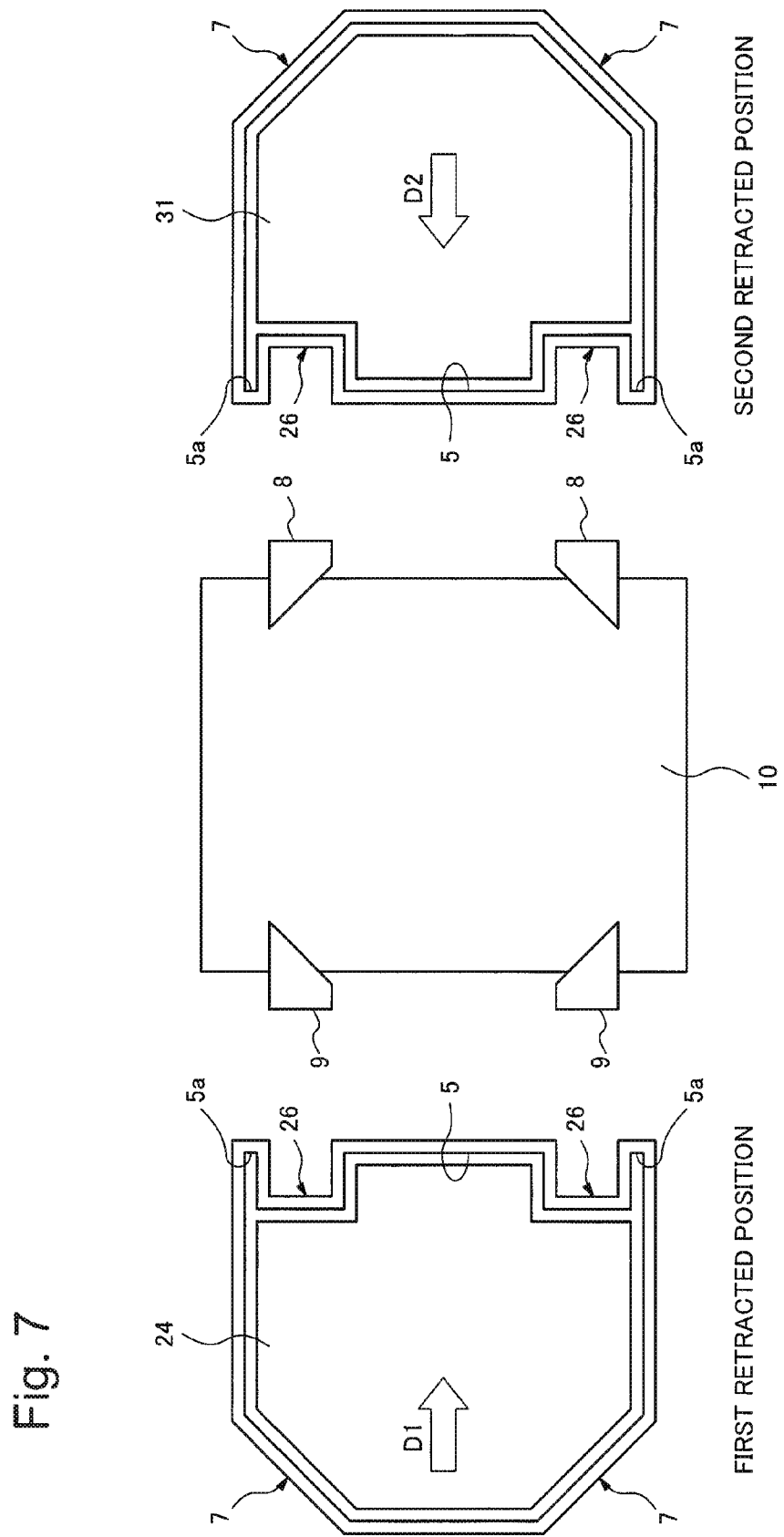
FIG. 7 is a schematic plan view of a sheet-laminating device in a second exemplary embodiment of the present invention.
Figure 8:
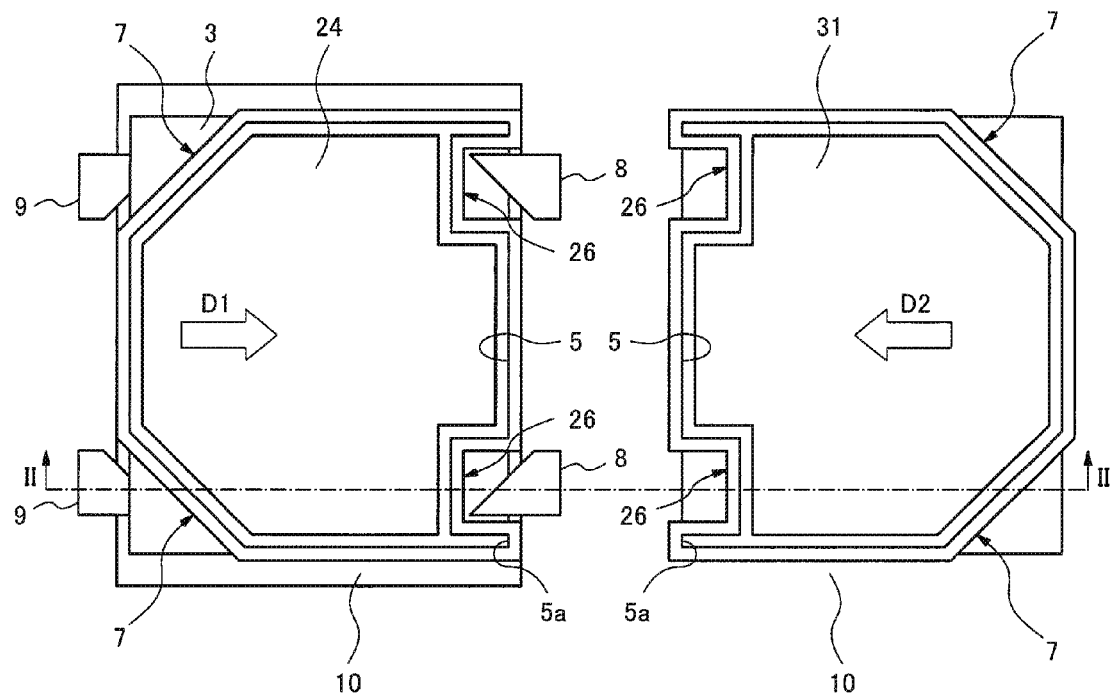
FIG. 8 is a schematic plan view of the sheet-laminating device in a certain state of the second exemplary embodiment.
Figure 9:
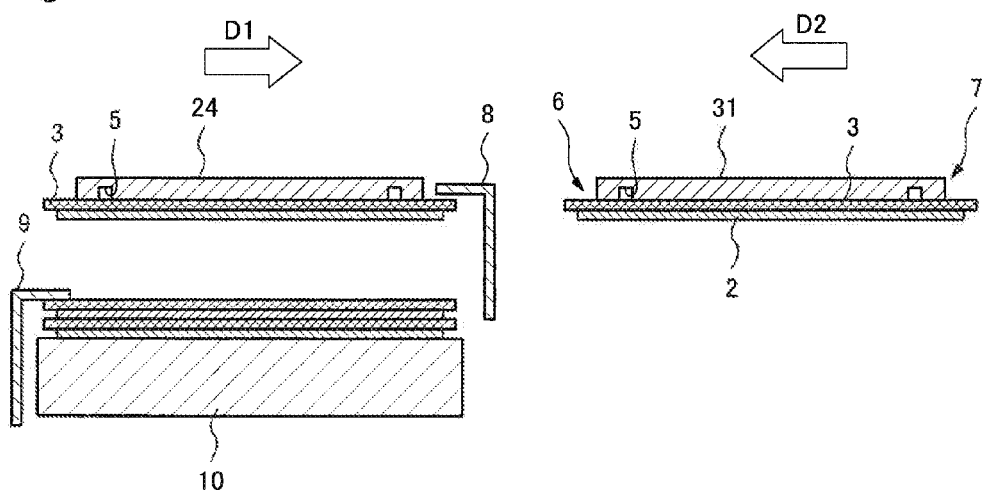
FIG. 9 is a schematic cross sectional view of the sheet-laminating device along an II-II line of FIG. 8.

FIG. 7 is a schematic plan view of a sheet-laminating device in a second exemplary embodiment of the present invention. FIG. 8 is a schematic plan view of the sheet-laminating device in a certain state of the second exemplary embodiment. FIG. 9 is a schematic cross sectional view of the sheet-laminating device along an II-II line of FIG. 8.

As shown in FIG. 7, a sheet-laminating device according to a second exemplary embodiment of the present invention includes a stage 10, first clamping devices 8, second clamping devices 9, a first conveyance handler 24 and a second conveyance handler 31. Further, the sheet-laminating device is provided with a control unit 13 like the first exemplary embodiment.

The first conveyance handler 24 and the second conveyance handler 31 in the second exemplary embodiment have the shapes different from the first conveyance handler 4 and the second conveyance handler 11 in the first exemplary embodiment. Because the configuration and the laminating operation except for these shapes are the same as that of the first exemplary embodiment, the detailed description thereof will be omitted.

The first conveyance handler 24 can hold sheets like the first sheet 1 and the interlayer sheet 3. The second conveyance handler 31 can hold sheets like the second sheet 2 and the interlayer sheet 3.

As shown in FIG. 7 and FIG. 8, the first conveyance handler 24 has first cut-out portions 26 in one side thereof in front of the movement direction D1 of moving toward the standby position in the state of holding the first sheet 1 and the interlayer sheet 3. That is, although the cut-out portions 6 are formed in the corners of the first conveyance handler 4 and the second conveyance handler 11 as shown in FIG. 1 and FIG. 2 in the first exemplary embodiment, the first cut-out portions 26 of this exemplary embodiment are formed in one side of the first conveyance handler 24. Further, the first conveyance handler 24 has second cut-out portions 7 in one side behind the movement direction D1. That is, the second cut-out portions 7 of this exemplary embodiment are formed in the corner of the first conveyance handler 4 and the second conveyance handler 11 like the cut-out portion 7 of the first exemplary embodiment.

As shown in FIG. 8, the first clamping devices 8, seeing from the direction vertical to the surface of the sheet, are arranged in the position of the first cut-out portions 26 of the first conveyance handler 24. As shown in FIG. 8, the second clamping devices 9, seeing from the direction vertical to the surface of the sheet, are arranged in the position of the second cut-out portions 7 of the first conveyance handler 24. The second clamping devices 9, seeing from the direction vertical to the surface of the sheet, are arranged in a position of the first cut-out portions 26 of the second conveyance handler 31. The first clamping devices 8, seeing from the direction vertical to the surface of the sheet, are arranged in the position of the second cut-out portions 7 of the second conveyance handler 24. The second conveyance handler 31 is line-symmetric with respect to the first conveyance handler 24.

The first conveyance handler 24 and the second conveyance handler 31 hold the sheet with at least a portion of a periphery thereof protruding like the first exemplary embodiment. By forming the first cut-out portion 26 in one side of the first conveyance handler 24 and the second conveyance handler 31 in this exemplary embodiment, the sheet is held with at least a portion of one side thereof being exposed. In FIG. 8, hatching has been added also to the part of the suction groove 5 in order to make intelligible an overlapped state of the interlayer sheet 3, and the first conveyance handler 24 and the second conveyance handler 31.

In this exemplary embodiment, in the movement directions D1 and D2 of the conveyance handlers 24 and 31, the first cut-out portion 26 is located in a part slightly apart from the corner of the sheet. A part 5a of the suction groove 5 extends to at around the end of the conveyance handlers 24 and 31 so that two corners in one side of the sheet by the side of the movement directions D1 and D2 of the conveyance handlers 24 and 31 can be held. As a result, the conveyance handlers 24 and 31 can perform suction holding of two corners of one side of the sheet located at front of the movement direction D1 and D2. Accordingly, even when the conveyance handlers 24 and 31 move at high speed, the sheets 1, 2 and 3 can be prevented from being departed from the conveyance handlers 24 and 31. As a result, a cycle time in the sheet-laminating method can be improved.

That is, a sheet laminate in which optional numbers of sheets are laminated mutually can be formed by performing repeatedly FIGS. 5A-5H and FIGS. 6A-6H, or FIGS. 5A-5D, FIGS. 5F-5H, FIGS. 6A-6D, and FIGS. 6F-6H like the first exemplary embodiment.

Even when the conveyance handlers 24 and 31 having different shapes from the conveyance handlers 4 and 11 of the first exemplary embodiment are used like this exemplary embodiment, a sheet laminate in which optional numbers of sheets are laminated mutually can be formed like the first exemplary embodiment. Therefore, a cycle time in laminating a sheet can be reduced like the first exemplary embodiment.

In this exemplary embodiment, the sheet holding capacity of the conveyance handlers 24 and 31 is improved by the part 5a of the suction groove 5 of the conveyance handlers 24 and 31 extending to at around the end of the conveyance handlers 24 and 31, compared with that in the first exemplary embodiment. In particular, because conveyance handlers 24 and 31 can perform suction holding of two corners of one side of the sheet located in front of the movement direction D1 and D2, even when the conveyance handlers 24 and 31 move from the retracted position to the standby position at high speed, the ability to prevent the sheets 1, 2 and 3 from being departed from the conveyance handlers 24 and 31 improves more than the first exemplary embodiment.

Third Exemplary Embodiment

Figure 10:
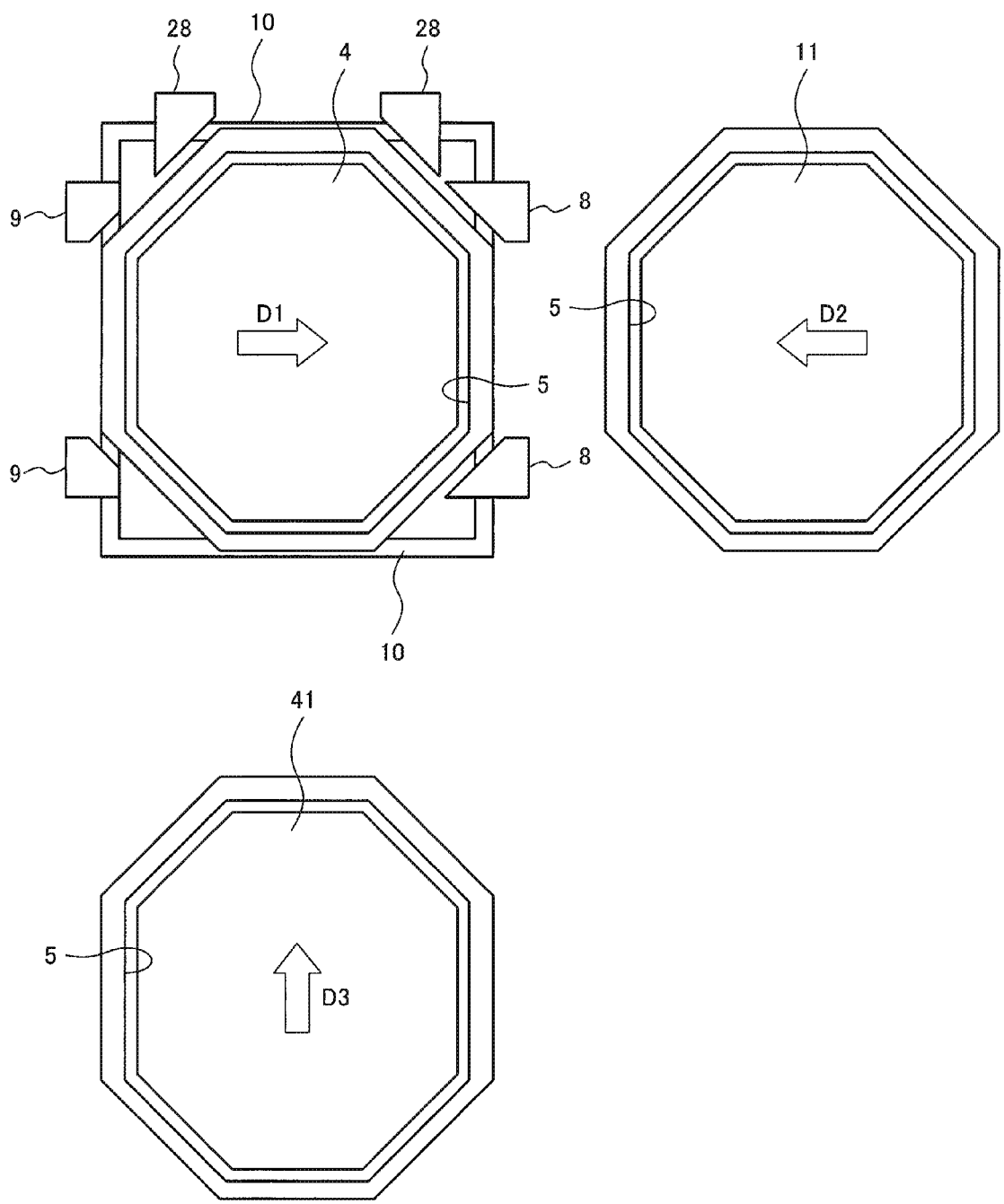
FIG. 10 is a schematic plan view of a sheet-laminating device in a third exemplary embodiment of the present invention.

FIG. 10 is a schematic plan view of a sheet-laminating device in a third exemplary embodiment of the present invention.

As shown in FIG. 10, a sheet laminating device in a third exemplary embodiment of the present invention includes a stage 10, first clamping devices 8, second clamping devices 9, a first conveyance handler 24, a second conveyance handler 31 and a third conveyance handler 41. Further, the sheet laminating device is provided with a control unit like the first exemplary embodiment and the second exemplary embodiment. Because the component except for the third conveyance handler 41 is similar to the sheet laminating device in the first exemplary embodiment, detailed description thereof will be omitted.

The third conveyance handler 41 has the same configuration as the first and the second conveyance handlers 4 and 11, and can hold a sheet. A direction where the third conveyance handler 41 holding a sheet moves from the retracted position to the standby position above the stage 10, in other words, a direction where the held sheet is conveyed to the standby position from the retracted position, a direction shown in FIG. 10 by an arrow is set as a third movement direction D3. In case of this exemplary embodiment, the movement direction D3 where the third conveyance handler 41 moves toward the standby position in the state of holding the sheet is 90° different from the movement direction D1 where the first conveyance handler 4 moves toward the standby position with the sheet held. In this case, a third clamping device 28 as shown in FIG. 10 may be provided corresponding to the movement direction D3 of the third conveyance handler 41.

The third clamping devices 28 press and hold the periphery of the sheet in the front side of the movement direction D3 of the third conveyance handler 41. By pressing and holding with this third clamping devices 28, a cycle time in lamination operation can be reduced.

Operation of this exemplary embodiment when using the third conveyance handler 41 and the third clamping device 28 is described. A case where the first conveyance handler 4, the second conveyance handler 11 and the third conveyance handler 41 convey sheets in turns, and laminate is described as an example. After the lamination operation by the second conveyance handler 11 is completed, third clamping device 28 is moved to the standby position. Next, the third conveyance handler 41 is moved to the standby position above the stage 10 from the retracted position.

Next, the third conveyance handler 41 is descended toward the stage 10, and then the third clamping device 28 is descended toward the stage 10 to press the periphery of the sheet protruding from the third conveyance handler 41 toward the stage 10. Otherwise, the descent of the conveyance handler 41 and the descent of the third clamping device 28 are performed simultaneously, and the periphery of the sheet protruding from the third conveyance handler 41 is pressed toward the stage 10. Thus, the lamination operation by the third conveyance handler 41 and third the clamping device 28 can be performed.

When the first and the second clamping devices 8 and 9 are being ascended, because there is a possibility that the third conveyance handler 41 which is moving may interfere in the first and the second clamping devices 8 and 9, the first and the second clamping devices 8 and 9 are controlled so that they may be in a descended state.

When the third clamping device 28 is not installed, the lamination operation is possible by using the first and the second clamping devices 8 and 9. In that case, when the third conveyance handler 41 is moved to the standby position in the state of the first and the second clamping devices 8 and 9 being ascended, there is a possibility that the first clamping device 8 and the second clamping device 9 may interfere in the third conveyance handler 41. Therefore, after the third conveyance handler 41 is moved to the standby position, the first clamping device 8 and the second clamping device 9, or a part of the first clamping device 8 and the second clamping device 9 should be operated. Although a cycle time in the lamination operation is increased compared with the case when the third clamping device 28 was installed, increase in the cycle time of the lamination operation with respect to the first and the second conveyance handlers 4 and 11 does not occur.

Although the movement direction D3 of the third conveyance handler 41 is 90° different from the movement direction D1 of the first conveyance handler 4 in the third exemplary embodiment, a conveyance handler which moves in a different direction at optional angles may be used. The sheet-laminating device may be provided with three or more conveyance handlers. For example, when four conveyance handlers are provided, a sheet-laminating device which conveys sheets to be laminated toward a stage from four movement directions different each other may be assumed.

A sheet laminate can be formed with one conveyance handler. In this case, in FIG. 5H or FIG. 6H, a conveyance handler should retract in a reverse direction of the arrow in the drawing.

Although the preferred exemplary embodiment of the present invention was presented and described in detail above, the present invention is not limited to the abovementioned exemplary embodiments, and it should be understood that various changes and modifications are possible without departing from the spirit.

This application is based upon and claims the benefit of priority from Japanese patent application No. 2012-79413, filed on Mar. 30, 2012, the disclosure of which is incorporated herein in its entirety by reference.

REFERENCE SIGNS LIST 1 first sheet
2 second sheet
3 interlayer sheet
4, 24 first conveyance handler
5 suction groove (holding means)
6, 26 cut-out portion
7 cut-out portion
8 first clamping device
9 second clamping device
10 stage
11, 31 second conveyance handler
12 sheet laminate
13 control unit

What is claimed is:

1. A sheet-laminating device comprising:
a stage configured to have loaded thereon a sheet laminate, the sheet laminate comprising a plurality of sheets being laminated;
a first conveyance handler, provided with a cut out portion at a peripheral portion thereof, which can move between a standby position located above a stage and a retracted position retracted from the standby position, and can move vertically to the stage, and is capable of holding a sheet in a manner such that at least a portion of a periphery of the sheet is exposed at the peripheral portion thereof;
a first clamping device movable between a first pressing position where a portion in a first side of the sheet laminate on the stage is pressed toward the stage, and a first upper position that is above the first pressing position and is adjacent to the standby position;
a second clamping device movable between a second pressing position where a portion in a second side different from the first side of the sheet laminate on the stage is pressed toward the stage and a second upper position that is above the second pressing position and is adjacent to the standby position; and
a control unit causing: the first clamping device to move to the first upper position while the portion of the second side of the sheet laminate on the stage is being pressed with the second clamping device; the first conveyance handler, which is holding a first sheet, to move to the standby position above the stage from the direction opposite to the first clamping device with the stage therebetween, and bring in a condition such that the first clamping device and an exposed portion of the sheet at the peripheral portion of the first conveyance handler are facing each other; the first conveyance handler to be descended toward the stage to laminate the first sheet on the sheet laminate, which is being pressed by the second clamping device; and the first clamping device to be descended toward the stage to press the periphery of the first sheet toward the stage,
wherein the first clamping device is configured to move to the first upper position when the portion of the second side of the sheet laminate on the stage is being pressed with the second clamping device,
wherein the first conveyance handler is configured to, while holding a first sheet, move to the standby position above the state from the direction opposite to the first clamping device with the stage therebetween, and be brought into a condition such that the first clamping device and an exposed portion of the sheet at the peripheral portion of the first conveyance handler are facing each other, and descend toward the stage to laminate the first sheet on the sheet laminate,
wherein the first clamping device is further configured to descend toward the stage to press the periphery of the first sheet, which is being pressed by the second clamping device; toward the stage.

2. The sheet-laminating device according to claim 1, wherein the control unit controls the first conveyance handler and the first clamping device so that the first clamping device may be finished moving to the first upper position before the first conveyance handler is finished moving to the standby position.

3. The sheet-laminating device according to claim 1, wherein the control unit carries out descending the first conveyance handler and descending the first clamping device simultaneously.

4. The sheet-laminating device according to claim 1, wherein the control unit descends the first clamping device after the first conveyance handler was descended.

5. The sheet-laminating device according to claim 1, wherein when a direction in which the first conveyance handler moves from the retracted position to the standby position is defined as a movement direction, a cut-out portion is provided in at least one corner located in a front side of the movement direction of the first conveyance handler.

6. The sheet-laminating device according to claim 5, wherein the cut-out portion located in the front side of the movement direction of the first conveyance handler, when seeing from the direction vertical to a surface of the sheet laminate, is confronted with one side of the first clamping device.

7. The sheet-laminating device according to claim 1, wherein when a direction in which the first conveyance handler moves from the retracted position to the standby position is defined as a movement direction, cut-out portions are provided in a pair of corners of the first conveyance handler located in front of the movement direction, respectively.

8. The sheet-laminating device according to claim 1, wherein when a direction in which the first conveyance handler moves from the retracted position to the standby position is defined as a movement direction, the cut-out portion is provided in one side located in a front side of the movement direction of the first conveyance handler.

9. The sheet-laminating device according to claim 8, wherein the cut-out portion is provided in at least one corner located in a rear side of the movement direction of the first conveyance handler.

10. The sheet-laminating device according to claim 9, wherein the cut-out portion located in the rear side of the movement direction of the first conveyance handler, when seeing from the direction vertical to a surface of the sheet laminate, is confronted with one side of the second clamping device.

11. The sheet-laminating device according to claim 8, wherein cut-out portions are provided in a pair of corners located in a rear side of the movement direction of the first conveyance handler, respectively.

12. The sheet-laminating device according to claim 1, wherein when a direction in which the first conveyance handler moves from the retracted position to the standby position is defined as a movement direction, plural cut-out portions are provided in one side located in a front side of the movement direction of the first conveyance handler.

13. The sheet-laminating device according to claim 1, wherein the first conveyance handler, when seeing from the direction vertical to a surface of the sheet laminate, is provided with cut-out portions cut out at the positions of the first clamping device and the second clamping device.

14. The sheet-laminating device according to claim 13, wherein the cut-out portions located in the front side of the movement direction of the first conveyance handler are formed in positions apart from two corners of one side of the first sheet,
and the first conveyance handler holds the two corners of the first sheet in the front side of the movement direction.

15. The sheet-laminating device according to claim 14 further comprising a second conveyance handler which can move between the standby position and another retracted position located in an opposite side of the retracted position with the standby position therebetween, and can move vertically to the stage, and is capable of holding the sheet with at least a portion of a periphery thereof protruding, wherein
the first side of the sheet laminate which the first clamping device presses is a side which opposes the second side of the sheet laminate which the second clamping device presses, and
the control unit causes: the first conveyance handler to retract; the second clamping device to move to the second upper position while the first side of the sheet laminate on the stage is being pressed with the first clamping device; and the second conveyance handler, which is holding a second sheet, to move to the standby position above the stage from the direction opposite to the second clamping device with the stage therebetween.

16. The sheet-laminating device according to claim 1 further comprising a second conveyance handler which can move between the standby position and another retracted position that was retracted from the standby position, and can move vertically to the stage, and is capable of holding a sheet with at least a portion of a periphery thereof protruding, wherein
the control unit causes: the first conveyance handler to retract; the second clamping device to move to the second upper position while the first side of the sheet laminate on the stage is being pressed with the first clamping device; and the second conveyance handler, which is holding a second sheet, to move to the standby position above the stage from the direction opposite to the second clamping device with the stage therebetween.

17. The sheet-laminating device according to claim 16, wherein the control unit controls the second conveyance handler and the second clamping device so that the second clamping device may be finished moving to the second upper position before the second conveyance handler is finished moving to the standby position.

* * * * *